March 9, 1943. R. N. RICHARDS 2,313,361
CLUTCH MECHANISM
Filed Feb. 5, 1941
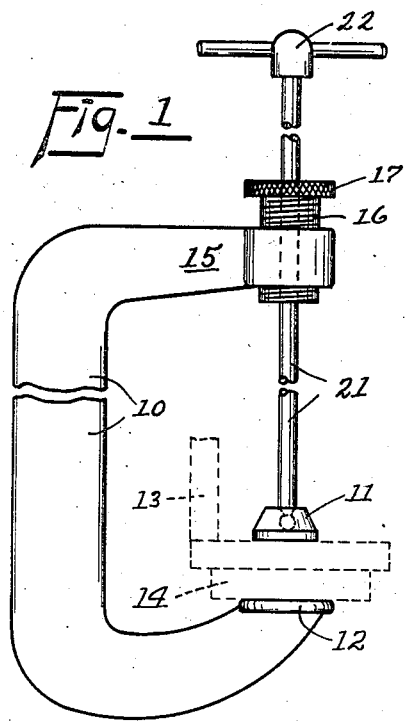
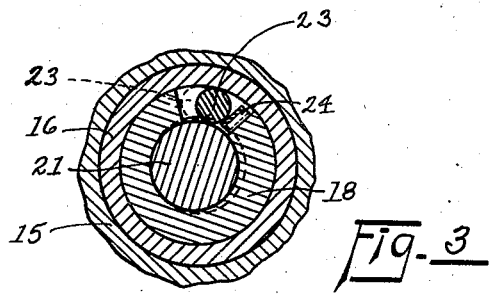
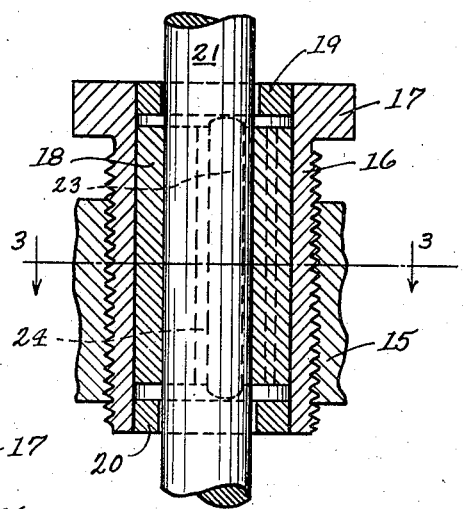
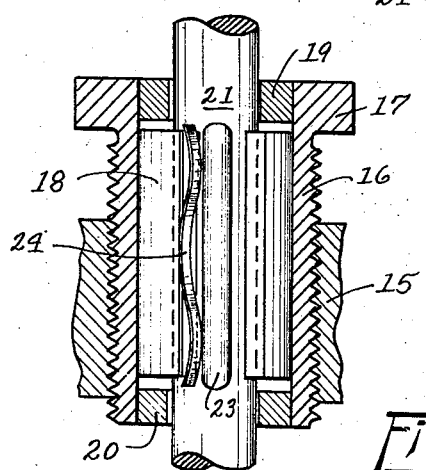
Witness:
Geo L. Chapel
Inventor
Ralph N. Richards
By Rice and Rice
Attorneys Patented Mar. 9, 1943

2,313,361

UNITED STATES PATENT OFFICE 2,313,361

CLUTCH MECHANISM

Ralph N. Richards, Kalamazoo, Mich., assignor to Wilma Rhodes Richards, Kalamazoo, Mich.

Application February 5, 1941, Serial No. 377,409

3 Claims. (Cl. 192—45)

The present invention relates to clutch mechanisms and more particularly to quickly adjustable one way clutch mechanisms.

The primary objects of the instant invention are to provide a clutch mechanism of the general character above indicated which is adaptable for use in a number of instances and in a wide variety of situations; to provide such a clutch mechanism which is most convenient in use; and, to provide such a clutch mechanism which is reasonably economical in manufacture.

Illustrative embodiments of the invention are shown in the accompanying drawing, wherein:

Figure 1 is a view of the clutch mechanism here shown in the form of a C-clamp;

Figure 2 is an enlarged fragmentary longitudinal central sectional view of a portion of the clutch mechanism shown in Figure 1;

Figure 3 is a sectional view thereof on line 3—3 of Figure 2; and

Figure 4 is a fragmentary longitudinal sectional view along one side of a portion of the clutch mechanism.

Referring then to the drawing wherein like parts of the clutch mechanism shown are each designated by the same numerals in the several views, the clutch mechanism there shown is in the form of a C-clamp generally designated 10 having jaws 11, 12 between which the work pieces 13, 14 may be quickly clamped under adjustable pressures.

The arm 15 of the C-clamp is provided with a right hand screw threaded bore within which a screw threaded sleeve 16 having a knurled head 17 is screw threadedly disposed.

A sleeve 18 longitudinally split and thicker cross sectionally along one length of the split than along the other length thereof is embraced within the sleeve 16 and within which it is retained by oppositely disposed washers 19, 20 inserted and secured within the opposite ends of the sleeve 16.

A shaft 21 having a cross head 22 and pivotally connected at its other end to the jaw 11 is longitudinally slidably embraced within the split sleeve 18 and its retaining washers 19, 20 and a roller 23 is disposed between the opposite longitudinal lengths of the split sleeve and between the rod 21 and the inner wall of the sleeve 16.

An elongated spring 24, flat cross sectionally and wavy like longitudinally, is here shown as disposed between the roller 23 and the thicker wall of the sleeve split longitudinally of both the roller and split sleeve.

A right hand rotation of the cross head 22 causes the shaft 21 to rotate against the roller 23 which in turn is caused to rotate from its position shown in full lines in Figure 3 to its position shown in dotted lines in the same view and away from the spring 24.

Since the space defined by the opposite longitudinal lengths of the split sleeve 18 is radially narrower along one length of the split sleeve than along the other length thereof because of the cross sectionally eccentric disposition of the sleeve 18 within its embracing sleeve 16, the roller is caused to adjustably bind the shaft 21 to the inner wall of the sleeve 16 during a right hand rotation of the cross head 22.

When this binding pressure becomes sufficiently strong, continued rotation of the cross head 22 effects a rotation of the screw threaded sleeve 16 within the bore of the arm 15 of the C-clamp 10 to secure the work pieces 13, 14 between its jaws 11, 12 and under adjustable pressures.

A quick reversed or left hand rotation of the cross head 22 effects a release of the binding pressure of the roller 23 against the inner wall of the sleeve 16, permitting a manual sliding outward movement of the shaft 21 and a withdrawal of the jaw 11 away from the fixed jaw 12 thereby releasing the work pieces 13, 14 whereas a slow left hand rotation of the cross head 22 does not release the binding pressure of the roller 23 and results in a turning movement of the sleeve 16 within the bore of the arm 15 of the C-clamp 10.

Thus in operation, the C-clamp may be quickly adjusted to clamp work pieces between its jaws 11, 12 in a progressive operation such as in an assembly line, particularly in instances wherein a portion of the width of a work piece is greater in part than it is at its clamped portion as for example the L-shaped work piece 11 shown in Figure 1.

It will thus be seen that the clutch mechanism herein shown and described is adaptable for convenient use in a number of instances and in a wide variety of ways, and while but one specific embodiment of the invention has been herein shown and described, it will be understood that certain details of the construction shown may be altered or omitted without departing from the spirit of the invention as the same is defined by the following claims.

I claim:

1. A clutch mechanism comprising a cylinder, a longitudinally split sleeve disposed within said cylinder and cross sectionally thicker adjacent one wall of the split than adjacent the other wall thereof, a roller disposed between the opposite longitudinal walls of the split sleeve, and a shaft longitudinally slidably embraced within the split sleeve when rotated in one direction but in adjustable binding engagement with the cylinder when in oppositely rotated contacting engagement with the roller.

2. A clutch mechanism comprising a cylinder, a longitudinally split sleeve disposed within said cylinder and cross sectionally thicker adjacent one wall of the split than adjacent the other wall thereof, a roller disposed between the opposite longitudinal walls of the split sleeve, a spring interposed between the roller and the thicker wall of the sleeve split longitudinally of the roller and split sleeve, and a shaft longitudinally slidably embraced within the split sleeve when rotated in one direction but in adjustable binding engagement with the cylinder when in oppositely rotated contacting engagement with the roller.

3. A clutch mechanism comprising a cylinder, a longitudinally split sleeve disposed within said cylinder and cross sectionally thicker adjacent one wall of the split than adjacent the other wall thereof, a roller disposed between the opposite longitudinal walls of the split sleeve, a washer disposed within each opposite end of the cylinder for retaining the split sleeve and roller therein and a shaft longitudinally slidably embraced within the split sleeve when rotated in one direction but in adjustable binding engagement with the middle sleeve when in oppositely rotated contacting engagement with the roller.

RALPH N. RICHARDS.